No. 741,569. PATENTED OCT. 13, 1903.
H. G. VOIGHT.
MOLDING MACHINE.
APPLICATION FILED APR. 8, 1903.
NO MODEL. 6 SHEETS—SHEET 3.

Witnesses:
Calderon C. Fuss.
E. A. Jarvis.

Inventor
Henry G. Voight
By his Attorney,
F. H. Richards.

No. 741,569. PATENTED OCT. 13, 1903.
H. G. VOIGHT.
MOLDING MACHINE.
APPLICATION FILED APR. 8, 1903.
NO MODEL. 6 SHEETS—SHEET 5.

Witnesses
Caldero O. Fuss.
C. A. Jarvis.

Inventor
Henry G. Voight
By his Attorney
F. A. Richards.

No. 741,569. PATENTED OCT. 13, 1903.
H. G. VOIGHT.
MOLDING MACHINE.
APPLICATION FILED APR. 8, 1903.
NO MODEL. 6 SHEETS—SHEET 6.

Witnesses:
Fred E. Maynard
E. A. Jarvis

Inventor:
Henry G. Voight,
By his Attorney
F. H. Richards.

THE NORRIS PETERS CO., PHOTO-LITHO., WASHINGTON, D. C.

No. 741,569. Patented October 13, 1903.

UNITED STATES PATENT OFFICE.

HENRY G. VOIGHT, OF NEW BRITAIN, CONNECTICUT.

MOLDING-MACHINE.

SPECIFICATION forming part of Letters Patent No. 741,569, dated October 13, 1903.

Application filed April 8, 1903. Serial No. 151,590. (No model.)

*To all whom it may concern:*

Be it known that I, HENRY G. VOIGHT, a citizen of the United States, residing in New Britain, in the county of Hartford and State of Connecticut, have invented certain new and useful Improvements in Molding-Machines, of which the following is a specification.

This invention relates to molding-machines designed more particularly for the production or making of a complete mold in a single operation during which the forming of the cope and the nowel portions of the mold proceed concurrently.

The present improvements are especially adapted for use in connection with flask-molding, and they embody an organization whereby the operation of ramming is performed simultaneously in both sections of the flask, with the result that the portions of the mold located in or facing the two sections of the flask, respectively, are formed at the same time—that is, each by the same operation that forms the other. Mechanism is provided for then separating the sections of the mold from each other and freeing the molded pattern from the sand to permit the pattern to be readily withdrawn. This separation of the two flask-sections by the operator is effected through the actuation of mechanism which preferably accomplishes the separation by lifting the cope from the nowel through a distance such that when the pattern is raised from the latter it is free from the sand both above and below, as well as from the cope and nowel frames. The pattern may then be withdrawn laterally from between the separated flask-sections, which thereupon may be brought together to close the two portions of the mold. In the particular embodiment of the invention disclosed in the machine described herein the lifting of the pattern from the nowel is begun as soon as the cope has been raised above the plane of the pattern. Their simultaneous movement then continues until the pattern has been raised above the level of the upper edge of the nowel-frame.

Various types or classes of patterns may be used in the present machine—such, for instance, as single or multiple patterns. The machine is also equally adapted for the employment of stripping-plate patterns, as will hereinafter be more particularly set forth.

In the drawings which accompany the present specification there is disclosed an embodiment of the present invention, and in these drawings—

Fig. 6 representing a subsequent step in which by the continued operation of the operating-handle the pattern has been lifted free from the nowel.

Similar characters of reference designate corresponding parts in all the figures.

The machine will ordinarily comprise a suitable bed or platen, such as 2, for supporting the flask and which possesses adequate rigidity to resist the ramming or pressing action on the sand within the mold. I prefer to somewhat incline the upper face of the platen to cause any sand which may drop thereupon to roll down and off, thereby preventing the accumulation of sand upon the platen, which therefore acts as a sand-shedder. In the particular form and construction of the platen illustrated in the drawings the upper face thereof inclines downwardly from about the central longitudinal center line of the platen in opposite directions toward the front and toward the rear. While the present invention is of course not restricted to any particular details of construction for such platen, I may for convenience adopt those indicated in the drawings, in which a rigid platen-frame 3 is provided with cross bars or ribs 4, upon which the flask rests. In the space between the ribs and at the opposite sides of the platen are suitable plates, such as 5 and 6, sloping in opposite directions, as aforesaid, and fastened by screws 7 to the platen-frame. This latter will of course be properly braced or ribbed to render it rigid and firm. For holding the platen at a height proper for readily manipulating the machine, legs, such as 8, may be used, the same being rigidly secured to the platen in some suitable manner. The upper faces of the said ribs 4 lie substantially in a common plane and serve to level or determine the final position of the flask following the ramming or pressing of the sand therein.

For the purpose of ramming or pressing the sand about the pattern in the flask some suitable form of pressure mechanism is used. This mechanism may be of various types, and although I have found that a mechanism comprising a pressure-bar is well adapted for the purpose it is to be understood that by illustrating a type of pressure mechanism embodying such a pressure-bar it is not contemplated thereby to restrict the scope of the invention in any way. Suffice it here to say that the pressure mechanism now to be described has been found to answer present requirements.

Figures 1, 11, 13:
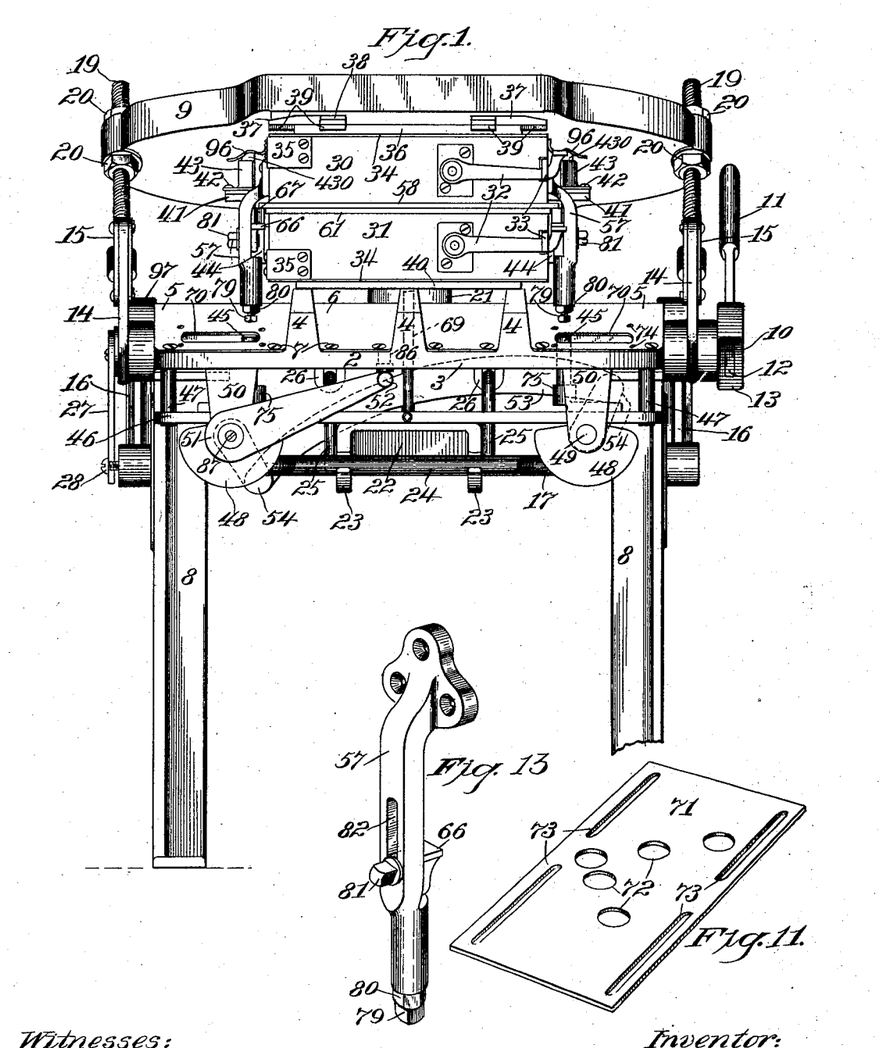
Figure 1 is a front elevation of the machine with the flask in position on the table or platen of the machine, the flask being assumed to be in condition for pressing, the presser-bar for pressing or ramming the flask being represented as thrown back away from the flask.
Fig. 11 is a similar view of one of a number of adjustable plates which may be secured to the upper part of the table or platen to close those portions of the slot therein not occupied by the raising-pins on the carrier.
Fig. 13 is a similar view of one of the pins or projections extending from the cope portion of the flask and with which a raising-pin on the aforesaid carrier is adapted to contact during the upward movement of the latter to effect the separation of the flask-sections and pattern, an adjustable end contact on the pin being shown, as well as an adjustable shoulder or shelf thereon for raising the pattern away from the nowel.
Figures 2, 9, 15:
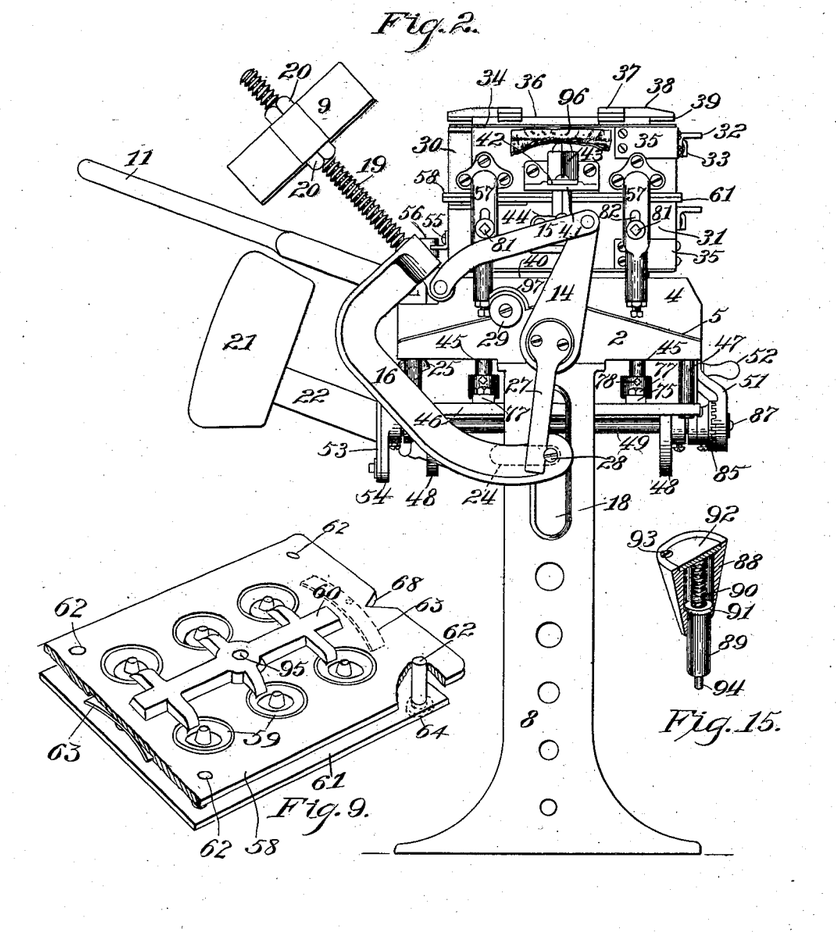
Fig. 2 is a side elevation of the machine as represented in Fig. 1, the view being taken from the left-hand side thereof.
Fig. 9 is a perspective view of the stripping-plate pattern, which in some of the preceding figures is shown in the flask.
Fig. 15 is mainly a detail section of a collapsible sprue-cutter which may be used with the present machine.
Figure 3:
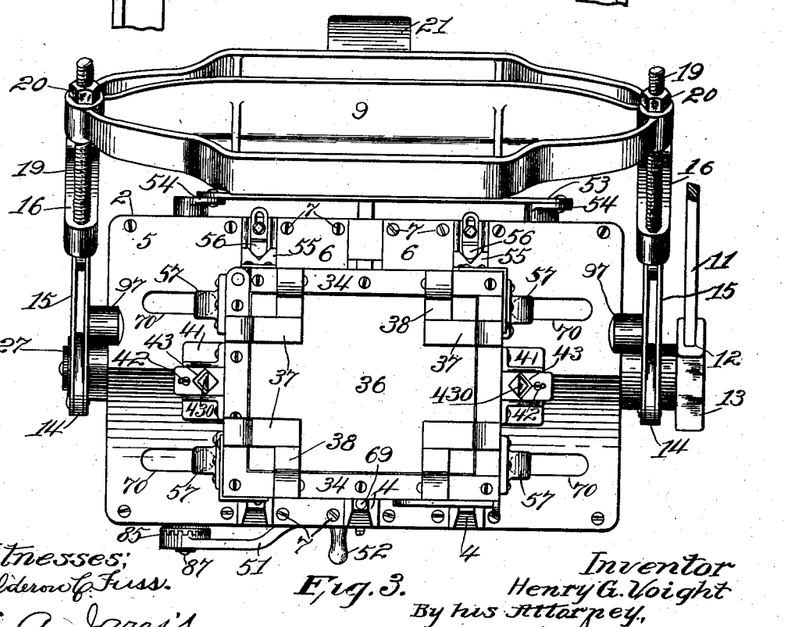
Fig. 3 is a plan view of the machine.
Figures 4, 14:
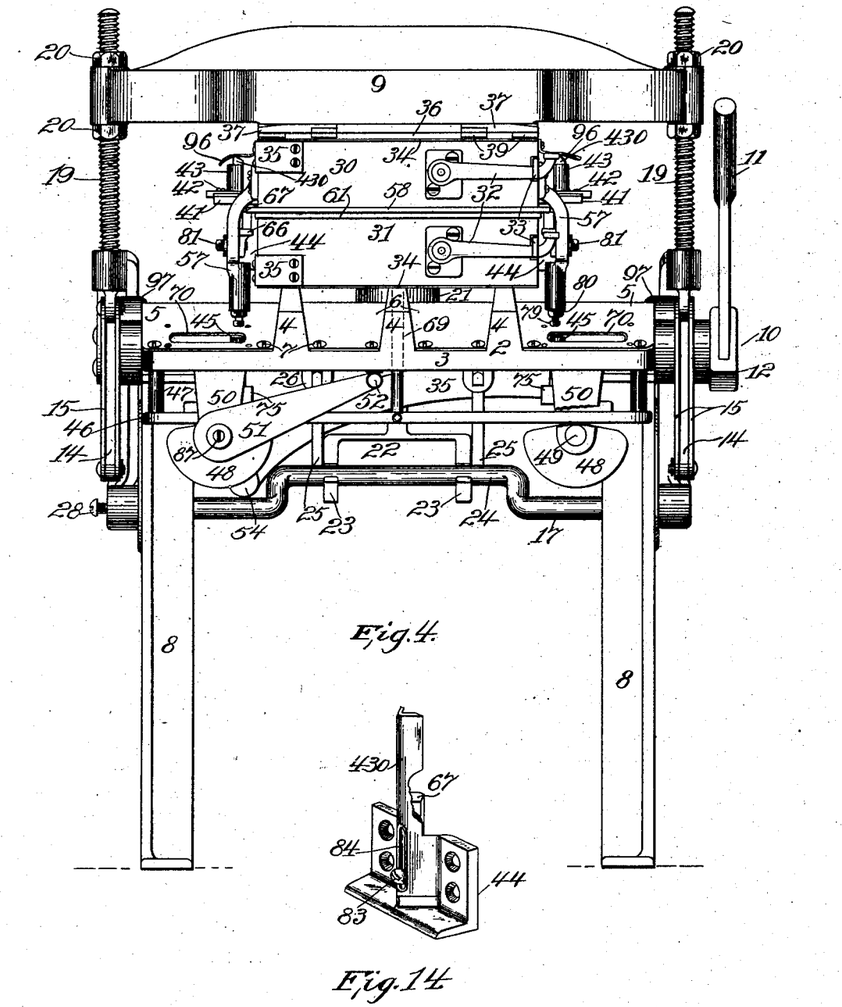
Fig. 4 is a view similar to Fig. 1, the presser-bar represented in the latter figure as thrown back or removed from above the flask being indicated in Fig. 4 as having been brought over the flask and drawn downwardly to thereby ram or press the sand within the sections of the flask.
Fig. 14 is a perspective view of a bracket secured to each side of the nowel-frame and from which there projects the male portion of a guide adapted, in conjunction with the guiding means on the cope, to center and guide the sections of the flask with reference to each other, an adjustable shoulder or shelf being indicated whose function is similar to that of the corresponding part referred to in the description of Fig. 13.

The particular pressure mechanism illustrated comprises a ribbed presser-bar 9, shiftable from a position at the rear of the machine to a position above the flask, (see Fig. 4,) whereupon it may be forcibly thrust downward to press or ram the sand by the following means: Extending from side to side of the machine and journaled in bearings supported thereon is a presser-bar-actuating shaft 10, provided with a hand-lever, such as 11, which may be adjustably mounted in a socket 12, located in a socket member 13 on the shaft. Attached to the aforesaid shaft and located at opposite sides of the machine are arms 14, to each of whose upper ends is pivoted a corresponding pair of links 15. A curved arm 16 is located at each side of the machine, with which the opposite ends of the pair of links thereat are pivotally connected. These arms 16 16 curve inwardly toward the center of the respective legs 8 8 and are connected together by a cross-bar 17, which passes through a guide-slot 18 in each leg of such form as to confine the bodily movement of the bar to an up-and-down reciprocation. The aforesaid presser-bar 9 is connected, preferably adjustably, with the arms 16 16. This connection in the form thereof illustrated comprises a threaded rod 19, rigid with and extending from each arm 16 and passing through an opening in the presser-bar, which latter by a proper adjustment of the holding-nuts 20 20 may be located and rigidly held in any desired position on the threaded rods. In order to hold the cross-bar 17 in a somewhat-elevated position in the guide-slots 18 18, and thus hold the presser-bar in its rearward position, as indicated in Fig. 2, at the same time leaving the bar free to be swung forward by the swinging of the operating-lever 11, a counterbalance 21 is provided, which may be adjustably fastened to an arm 22. This arm 22 at its inner end is bifurcated, forming branch arms 23 23, which are caught under a crank portion 24 of the cross-bar 17, while notches in the branch arms are seated upon a swinging link 25, hung from supports 26 26, depending from the under face of the platen. The limiting position of the presser-bar toward the rear is determined by a stop-arm 27, rigid with the shaft 10 and adapted to impinge against a stop-pin 28 as the presser-bar is swung to the rear. Such being the organization of the pressure mechanism, when the operating-lever 11 is brought forward—that is, toward the right in Fig. 2—the presser-bar will be swung forward and brought above the flask on the platen, the counterbalance during this movement maintaining the presser-bar elevated sufficiently to clear the flask. When the presser-bar shall have reached a substantially horizontal position, the edges of the arms 16 16 contacting with stops, such as 29, herein shown in the form of antifriction-rollers, further swinging movement of the presser-bar toward the front is prevented. Continued rotary movement of the operating-shaft now serves to draw the presser-bar downwardly, depressing the arms 16 16, cross-bar 17, and elevating the counterbalance 21. The parts are so organized that the center lines of the arms 14 14 as the presser-bar is about to come into contact with the flask approach more and more into alinement with the center lines drawn between the points of pivotal connection of the links 15. Hence these parts constitute a toggle, whereby a powerful downward pressure may be exerted by the presser-bar.

The ordinary two-part flask may be used in the present machine, and such flask may be of the snap variety. This is the character of flask indicated in the drawings, the upper section or the cope being designated by 30 and the lower section or nowel by 31. In the snap-flask construction illustrated the simple means for detachably connecting the parts of each flask-section together at their point of separation comprises a swinging tongue 32, adapted to be engaged with and disengaged from a keeper 33, extending from the flask. Of course each flask-section may have an articulated joint at the diagonally opposite corner, while, if desired, the upper edge of the cope-section and the lower edge of the nowel-section may be reinforced by metal strips, such as 34. For the same reason angle-pieces 35 may also be used, while the inner side of each section may be hollowed out, as shown at 35, the better to retain the pressed or rammed sand within the section.

The sand is of course in a loose or unpressed condition when first put into the flask-sections, being afterward compacted by the downward pressure of the presser-bar. In order to expedite the operation of rapidly forming the molds in succession, it is desirable that the presser-bar should be arrested in its movement at the proper point whatever be the pressure applied by the operator on the lever 11, whether the same be sufficient only to carry the presser-bar downward to the right point to properly pack the sand or whether a pressure be exerted more or less in excess of that. Having in mind the fact, furthermore, that the extent to which the loose sand within the mold-sections should be compacted is determined by various considerations—such as the particular composition of sand used, the character and form of the pattern, &c.—it is evident that the proper density of the sand is, within limits, a variable quantity. For practical reasons therefore and in order to expedite the molding operation and nevertheless produce satisfactory molds I employ mold or flask boards so constructed as to constitute, in conjunction with the edges of the flask and the upper surfaces of the ribs 4 of the platen, positive stops which determine the possible diminution of the volume occupied by the sand, no matter what the pressure with which the presser-bar is forced downward. Results obtained in practice demonstrate that a comparatively slight experience is sufficient to indicate to the operator under such circumstances the proper amount of sand to be put into the cope and the nowel to produce when pressed or rammed a mold of the proper density. A construction for the upper or cope board which I have found to fulfil all ordinary requirements comprises a board, such as 36, conforming in outline to but somewhat less in superficial dimensions than the open space through the cope. To this board there is secured adjacent to each corner thereof a pair of projecting stops 37 and 38, respectively, whose under faces—that is, those faces which contact with the upper edge of the cope—are reinforced by metal plates, such as 39. The distance between the plane of the lower surface of the main portion of the mold-board and the plane of the under faces of these stops determines the extent to which the sand within the cope is compacted.

The lower or nowel board is indicated by 40, this latter board not in this case being provided with stop, but being loosely fitted to the under side of the nowel-section, into which it is adapted to enter.

When the flask, with the pattern inclosed therein and with both of its sections filled with the loose or uncompacted sand, is fitted with the mold-boards and placed upon the ribs 4 of the platen, the plane of the lower edge of the nowel will be somewhat above the plane of the lower face of the nowel-board. Correspondingly the under surface of the stops of the cope-board will be raised somewhat off the upper edge of the cope. When more pressure is brought to bear upon the flask by the presser-bar, the compacting of the sand within the two sections of the flask occurs simultaneously and continues until the lower edge of the nowel contacts with the upper faces of the ribs 4, and the stop-fingers of the cope-board contact with the upper edge of the cope. It is manifest that no further compression will take place no matter what force is exerted on the lever 11 by the operator.

Suitable devices are preferably provided for causing the proper registry of the flask-sections with each other and for maintaining them in such proper and predetermined relation. A pair of such guide devices are located one at each side of the flask, each comprising a bracket 41, secured to the side of the cope, to a horizontal arm of which bracket is adjustably secured, as by a pin-and-slot connection 42, a member 43, having a guide-forming perforation through which is adapted to pass a V-shaped guide-pin 430, extending from a bracket 44, secured to the nowel. A certain part combines with such guide-pin 430, and the function performed thereby will be referred to later on.

The present machine is adapted to form molds from various types or classes of patterns, among which may be mentioned the ordinary plate-pattern and the stripping-plate pattern. In fact, so far as the purpose and function of the machine in its entirety is considered, patterns having means whereby they may be withdrawn from either one or the other of the flask-sections may be used. I have chosen, however, by way of illustration, to represent a stripping-plate pattern as used with the flask.

The operation of the machine comprises in a general way the hand operation of means for mechanically separating the sections of the flask from each other as well as mechanically drawing the pattern out of the sand and into a position where it may be removed from the flask without disturbing the sand in either section. In order to separate the flask-sections from each other, I find it convenient in practice to first lift the cope off the pattern, the nowel remaining at rest upon the platen. This withdrawal of the former section from the pattern is continued until the plane of the lower edge of the section is at least as high as the plane of the highest portion of the pattern. The machine which is illustrated in the drawings is adapted to thereafter continue this movement of the cope and simultaneously with such continued movement to raise the pattern away from the nowel until the pattern is free to be drawn out laterally from between the sections. After the pattern is withdrawn the upper section may be lowered until it rests upon the lower section. Proceeding now to a description of the specific means for effecting this sequential operation there is comprised therein a series of lifting devices for raising the cope uniformly and squarely off the pattern. These devices are in this instance in the nature of lifting-pins 45, a pair at each side of the flask and passing through openings in the platen. To secure the simultaneous movement of all the lifting-pins, they may be conveniently mounted upon a carrier, herein shown as a plate-like part 46, disposed below the platen 2 and constrained to a vertical movement by guide-pins, such as 47, projecting downward from the platen and passing through guide-openings in the carrier. Cam-like actuators are utilized for raising the carrier, the return of the lifted parts to their original position being effected by their weight. This actuating mechanism in the form thereof illustrated comprises a pair of actuators at each side of the machine, each pair including a cam-disk 48 at the front of the machine and a similar cam-disk 48 at the rear, both secured to a shaft 49, journaled in brackets 50, depending from the platen and bearing against the under face of the carrier 46 or fixtures thereof. One of the shafts 49 constitutes the actuating-shaft. It is provided with a crank-arm 51, carrying a handle 52. Both shafts 49 49 are compelled to move in unison, as the crank is turned by means of a link 53, pivotally connected at each end to an arm 54, extending from the shaft 49, adjacent thereto. The proper predetermined position of the flask on the platen is assured by shoving the flask toward the back of the platen until the walls of V-shaped notches in flanges 55, extending from the flask, come into contact with respective centering-pins 56, located at the rear side of the platen. The flask will then assume a position in which the end faces of projections 57, extending from the cope-frame, are directly above the respective lifting-pins on the carrier. If while the flask is in this position the crank-arm 51 be turned, the cope will be raised and withdrawn from contact with the pattern. When the cope shall have been raised sufficiently to elevate the lower edge thereof above the highest portion of the pattern, the machine then operates to lift the latter off the nowel.

Figure 5:
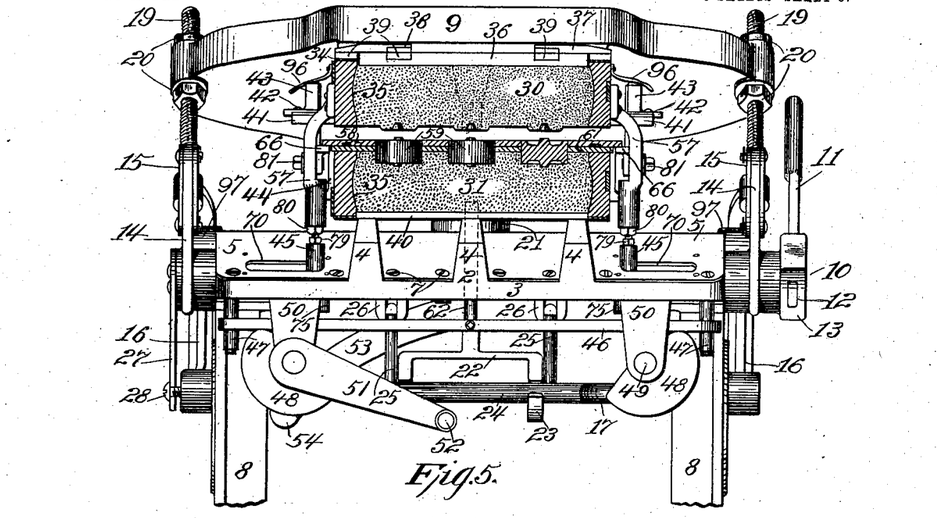
Figs. 5 and 6 are partially elevational and partially sectional views illustrating the manner in which the machine operates to separate the sections of the flask and free the pattern from the mold, Fig. 5 representing the next step in operation after that corresponding to Fig. 4, assuming that the presser-bar has in the latter figure been lifted off the flask and thrown back, following which the operator has, by turning the operating-handle, lifted the cope free from the pattern.

It has already been stated that the present machine is not restricted to the use of any particular style or type of pattern. As it is well adapted for use with a plate-pattern of the stripping-type variety, such a pattern is represented in the drawings. The plate of such pattern is designated by 58, and to the same is secured the various pattern-forms to be molded. In illustrating these latter it is to be understood, of course, that such representation is typical only of devices or forms to be molded, the same being designated in a general way by 59. They will of course be connected by a suitable gate, such as 60. The stripping-plate 61 is disposed below the pattern-plate 58 and is provided with perforations through which the pattern-forms extend and relatively to which latter the stripping-plate is shiftable parallel to itself, being guided by guide-pins, such as 62, secured in this instance to the plate 58 and extending through perforations in the stripping-plate. Springs, such as 63, may be provided for causing the separation of the pattern and stripping plates when the pressure on them is removed. (See, for instance, Fig. 5.) The limiting position of the stripping-plate is determined by shoulders 64 on the guide-pins 62. Both the pattern-plate and the stripping-plate are of sufficient dimensions to lap over the edges of the nowel when the pattern is placed in position thereon. Openings 65 in the nowel-frame permit free downward movement of the guide-pins 62 when the pattern is pressed down upon the nowel.

The pattern-plate 58 projects beyond the opposite sides of the flask and against the projecting edges. Shelf-like pieces or stops 66, carried by the projections 57 of the cope, are adapted to impinge at some time during the upward movement of the lifting-pins 45, the pattern-plate and pattern-forms thereafter accompanying the cope. Such movement of the cope, &c., continues until the pattern-plate, pattern-forms, and stripping-plate are raised above the upper edge of the nowel. (See, for instance, Fig. 6.) As the pattern-forms ascend with the rising pattern-plate the tendency of the friction of the moving forms to dislodge the sand in the sides of the mold is upward against gravity. The result of drawing the forms in this manner is to disturb the sand to the least amount. As the forms leave the molds the stripping-plate contacting with the shoulders 64 of the pins 62 is drawn upward with the pattern-plate until it clears the edge of the nowel. In this position of the parts the pattern may be slid out from between the separated sections. A rest for the pattern-plate at each side of the flask and intermediate between the stop on the pin 57 at the front and the stop on the corresponding pin at the rear is preferably provided, the same consisting in this case of the flattened end of a block 67, secured to the before-mentioned guide-pin 430 at each side of the nowel-frame. The ends of these blocks over which the pattern-plate slides when drawn forward are on a level with the under face of such plate when the latter has been raised to its highest position. The inner faces of each block also constitutes a guide for directing the longitudinal upward movement of the pattern-plate, notches, such as 68, being formed in the pattern-plate and loosely fitting around the guide-faces of the blocks. When the pattern-plate assumes its highest position, the notches are freed from the blocks, and as the plate is pulled forward the full or unnotched portions of the edges thereof at the rear of the notches slide onto and over the ends of the blocks as the pattern is drawn out by the operator.

In order to preclude any displacement of the flask during the various operations of the machine, a pin 69, secured to the carrier 46 and passing through a perforation in the platen, is adapted to move upward in front of the flask when the carrier is elevated, although when this latter is permitted to descend the pin is withdrawn from in front of the flask. The pin when raised in the manner aforesaid, in conjunction with the centering devices already described, at the rear of the machine, locks the flask from any accidental displacement, maintaining the same in correct position with reference to the lifting-pins 45.

In the description thus far given there is disclosed substantially the broader features and general scope of the present invention. In order, however, to adapt the present machine for using different-size flasks and flasks having different amounts of lift of the cope-section with reference to the nowel-section, as well as of the pattern with reference to the nowel-section and a possible variation in the range of movement of the cope-section with reference to the pattern, various adjustments for different parts, as hereinafter described, will usually be provided. Thus where the distance between the pair of projections 57 at each side of the flask remain substantially the same on all the different-size flasks which it is desired to use in the machine, and the only variation in this respect is that existing between the two front projections and the two rear projections, each corner portion of the platen may be provided with an elongated slot, (see 70,) through which the corresponding lifting-pin on the lifting-pin carrier move upward in separating the flasks. For the purpose of preventing the descent of the sand through the unused portion of the slot onto the carrier a shiftable cover-plate, such as 71, may be used at each corner of the platen, the same being provided with any desired number of openings, such as 72, predetermined in position to permit the passage upward of the corresponding lifting-pin, when the closure is shifted from front to rear of the machine, or vice versa, to bring the proper opening in alinement with the elongated slot in the platen. This adjustment may be readily secured by forming front-to-rear slots 73 in the closure-plate, through which slots and the platen extend corresponding clamping-screws 74.

To adjust the lifting mechanism to such changes in the size of the flasks used, the lifting-pins are made adjustable on the carrier. A construction permitting this adjustability consists of a pin-holder 75, whose horizontal member is provided with a slot 76, by which the holder may be secured, as by a clamping screw or bolt 77, in any desired position on the carrier. As it is desirable not to have the lifting-pins project to any great distance above the upper face of the platen when the carrier is in its lowermost position, these pins may be adjustably mounted in sockets in the pin-holders, being secured in position by set-screws 78. The amount of necessary lift of the cope-section of the flask also varies in practice, dependent largely upon the particular form and proportions of the pattern used. Hence a greater or less portion of the total lift of the lifting-pin carrier should be effective to raise the cope. This variation may be provided for by making the contact or working faces of the projections on the cope—that is, the faces with which the lifting-pins contact—adjustable toward and away from such pins. In this instance a screw 79 is engaged with a threaded socket in the end of each projection, the same being secured in an adjusted position by a check-nut 80, and, again, the lifting mechanism should have a capacity for beginning the upward movement of the pattern at an earlier or a later stage in the rising movement of the cope. This is provided for by making the aforesaid stops 66 adjustable on the projections 57, a clamping-screw 81, passing through an elongated slot 82 in the shank portion of the projection, serving to clamp the stop in the proper position with reference to the contact end of the projection. Correspondingly the blocks 67, associated with the guide-pins 43, are also made adjustable on the latter, a clamping-screw 83 passing through an elongated slot 84 in the upright portion of each guide-pin, enabling the block to be clamped in a position on the pin in which the plane of its upper end face alines with the plane of the upper face of the adjustable stop 66.

Different amounts of rise and fall of the lifting-pin carrier may be provided for by adjustably securing the hand-crank 51 to its shaft. In this instance the two are shown connected together by a toothed clutch 85, the two members of which when so engaged with each other as to give a desired initial position of the crank (determined by the contact thereof with a stop 86, preferably adjustable) may be securely fastened together by a screw 87.

A sprue former or cutter is of course used for forming a passage to permit the mold to be poured, and such former or cutter may be collapsible in order that the mold-boards may readily approach each other under the action of the presser mechanism. A satisfactory form of such a sprue-cutter is set forth in Fig. 15, in which the body or cone portion of the cutter, (designated by 88,) is bored to receive a stem 89, forced outward by a spring 90, to bring a shoulder 91 on the stem in contact with a shoulder within the bore of the body portion. A plate 92, against which the spring abuts, is fastened to the body portion of the cutter, as by screws 93, while the stem portion is provided with a pin 94, adapted to be seated in a socket 95 in the gate portion of the pattern. Such a sprue-cutter readily shortens as the mold-boards are forced together, forming, nevertheless, a fair, clean sprue-passage. Flexible shields 96 prevent the entrance of sand into the guide-sockets 43, while the stop-rollers 29 are also shielded by projecting flanges 97.

Figure 6:
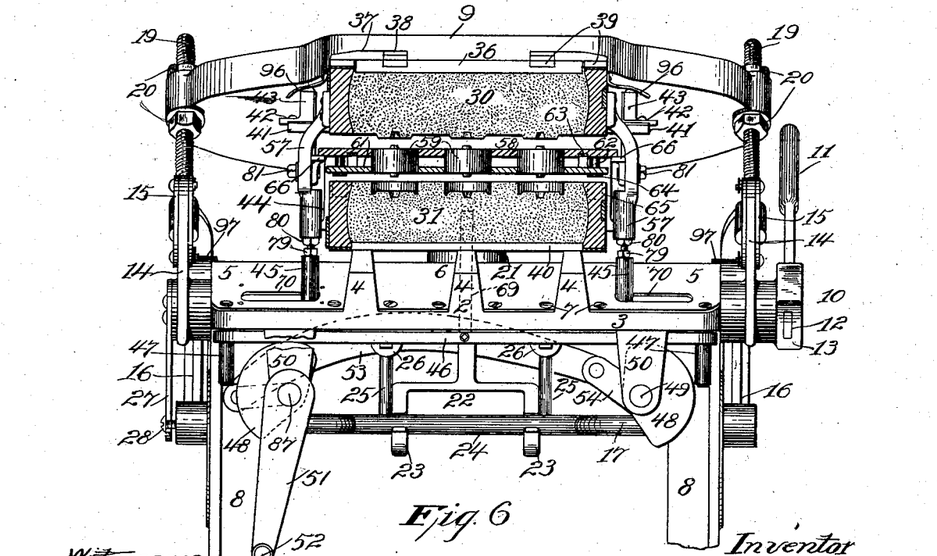
Figure 7:
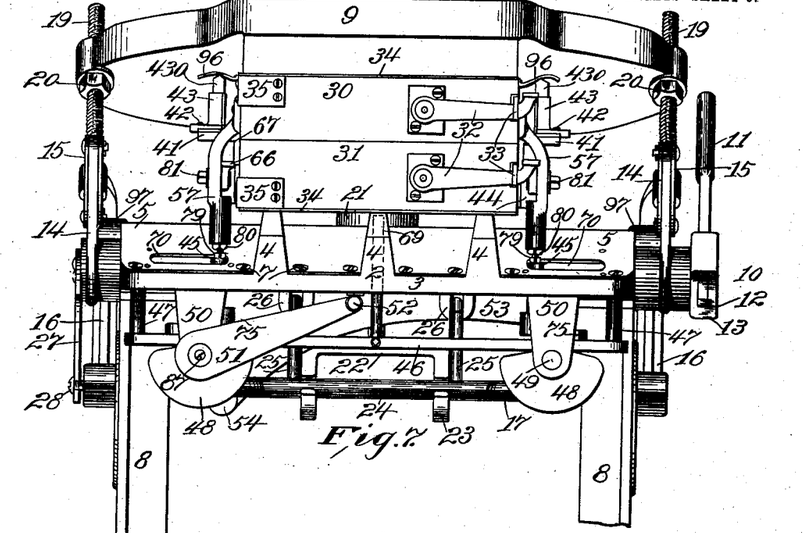
Fig. 7 represents the position of the parts in which the sections of the flask after the pattern has been slid out from between them have been caused to approach until the cope rests upon the nowel.
Figures 8, 10, 12:
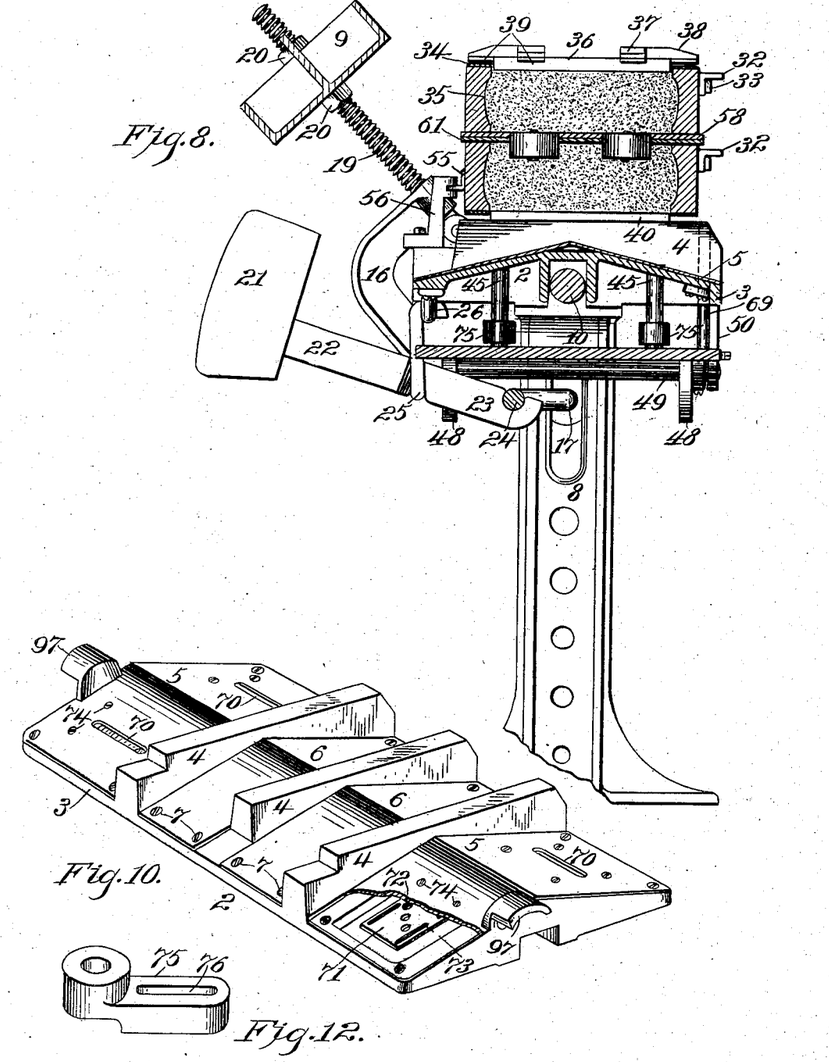
Fig. 8 is a vertical cross-section.
Fig. 10 is a perspective view, partially in section, of the platform or table upon which the flask is supported during the ramming operation and by which it is leveled.
Fig. 12 is a perspective view of a raising-pin holder adjustably clamped to the carrier, whose raising and lowering accomplishes the separation of flask-sections and pattern, as aforesaid.

A molding-machine such as described hereinbefore operates substantially in the following manner: The presser-bar 9 being in the position indicated in Fig. 2, the cope-board is first placed upon the platen—that is, upon the ribs 4—and on this is fitted the cope upside down. The pattern, likewise in a reversed position, is then placed upon the cope-section and after being properly centered is surmounted by the nowel-section, which is also wrong side up. The latter section is then filled with the proper quantity of sand and after the latter is struck the nowel-board is laid upon it. The operator then takes the flask and reverses its position, so that the nowel-section is brought underneath, and after removing the cope-board (which may or may not be used to rest the flask upon) the cope is then filled with sand, the latter struck, and the cope-board put in place. Assuming that the flask has been properly centered by forcing the same back in contact with the centering devices at the rear, the mold is now ready to be pressed. The operator by pulling the lever 11 forward brings the presser-bar 9 over the flask and by the continued movement of the lever forces the bar down on the flask, compressing the sand until the flask is leveled and the compression stopped by the contact of the lower edges of the nowel-section with the faces of the ribs 4 and the projections on the cope-board with the upper edge of the cope-section. A reverse movement of the lever forces the presser-bar back to its original position, and the operator grasping the handle 52 and rotating the crank in a clockwise direction, Fig. 5, raises the lifting-pin carrier 46, withdrawing the cope-section from the pattern. This movement continues until the stops 66 on the pins 57 come into contact with the projecting edges of the pattern-plate. (See Fig. 5.) Further movement of the crank lifts the cope-section a further distance and at the same time withdraws the pattern from the nowel until finally a position of the parts is taken such as indicated in Fig. 6. The operator now grasping the pattern withdraws the same from between the separated flask-sections and laying it aside reverses the movement of the crank 51, causing the cope-section to approach and ultimately rest upon the nowel-section. During this latter movement the locking-pin 69 is withdrawn from the front of the flask until as the crank is arrested from movement by contact with the stop 86 the flask is left free to be taken off of the platen. The operator may then remove the flask, and if a snap-flask is used may separate the flask-frames from the sand and repeat the molding operation.

Having described my invention, I claim—

1. In a molding-machine, the combination of a platen; a carrier; the cope-section of a flask having projections; lifting-pins shiftable with the carrier and which impinge against said projections of the cope-section as the carrier moves upward, said pins working through openings in the platen and means for positioning the pattern in the spaces between the separated sections and with reference to which means the pattern may be withdrawn laterally from between the sections.

2. In a molding-machine, the combination with a platen, of a flask supported thereon; guides for controlling the upward vertical movement of the cope-section of the flask; a pattern; guides for likewise controlling the upward vertical movement of the pattern; projections on said cope-section; a carrier; lifting-pins shiftable with the carrier and which impinge against said projections on the cope-section as the carrier moves upward;

and stops moving with the lifting-pins for lifting the pattern free from its guides.

3. In a molding-machine, the combination of a carrier; lifting-pins thereon; the cope-section of a flask having projections against which the lifting-pins impinge as the carrier moves upward; and stops on said projections adapted to lift the pattern from the nowel-section as said carrier moves upward.

4. In a molding-machine, the combination of a carrier; lifting-pins thereon; the cope-section of a flask having projections adjacent to the corners of the cope-section and against which the lifting-pins impinge as the carrier moves upward; and stops on said projections adapted to lift the pattern from the nowel-section as the carrier moves upward.

5. In a molding-machine, the combination of a platen; a device determining the position of a flask supported on the platen; cam-operated mechanism for raising the cope-section of the flask relatively to the platen and for also raising the pattern relatively to the platen; and a locking device for locking the flask in its predetermined position.

6. In a molding-machine, the combination of a platen; cam-operated mechanism for first raising the cope-section of a flask supported on the platen, and subsequently the pattern to a point where it may be withdrawn laterally from between the separated sections; means whereby the pattern may be withdrawn therefrom; a hand-crank for actuating the cam mechanism; and an adjustable stop for determining the initial position of said mechanism.

7. In a molding-machine, the combination of a platen; the cope-section of a flask provided with means for engaging with the pattern when the cope-section shall have been lifted; and mechanism for raising the cope-section.

8. In a molding-machine, the combination of a platen; the cope-section of a flask provided with means for engaging with the pattern when the cope-section shall have been lifted; a series of lifting-pins for raising the cope-section; and mechanism for elevating the pins.

9. The combination with a platen; of a cope-section provided with a series of projections having adjustable contact-faces; a series of stops on said projections adapted to engage with the pattern; and a series of pins adapted to impinge against said contact-faces and raise the cope.

10. The combination with a platen, of a cope-section provided with a series of projections having adjustable contact-faces; a series of adjustable stops on said projections adapted to engage with the pattern; and a series of pins adapted to impinge against said contact-faces and raise the cope.

11. In a molding-machine, the combination with a platen, of a shiftable carrier; a series of lifting-pins on said carrier and adjustable laterally thereof to engage with flasks of different sizes; and mechanism for shifting the carrier and thereby separating the pattern and the sections of a flask supported on the platen.

12. In a molding-machine, the combination with a platen, and mechanism for lifting the cope of a flask from the platen, of stops carried by the cope for lifting the pattern from the nowel; and a rest for the pattern at each side of the flask for supporting the pattern during its withdrawal from between the sections.

13. In a molding-machine, the combination of a platen; a carrier; a series of lifting-pins on the carrier and adapted to contact with projections on the cope-section of the flask and raise such section; mechanism for actuating the carrier; and a locking-pin on the carrier shiftable into a locking position when the carrier rises.

14. In a molding-machine, the combination of a platen; a series of lifting-pins adapted to contact with projections adjacent to the corners of the cope-section of a flask supported on the platen and which operate to raise the cope-section; a carrier on which the lifting-pins are supported; carrier-actuating mechanism; and rests at the sides of the cope-section and intermediate between the said projections.

15. In a molding-machine, the combination of a platen; a series of lifting-pins adapted to contact with projections adjacent to the corners of the cope-section of a flask supported on the platen and which operate to raise the cope-section; a carrier on which the lifting-pins are supported; carrier-actuating mechanism; and adjustable rests at the sides of the cope-section and intermediate between the said projections.

16. In a molding-machine, a flask having a cope-section provided with projections combined with stops on said projections adapted to engage with the pattern; guides for confining the separating movement of the sections of the flask to a movement substantially perpendicular to the plane of the meeting edges of the flask; and mechanism for raising the cope-section.

17. In a molding-machine, a flask having a cope-section provided with projections combined with stops on said projections adapted to engage with the pattern; guides for confining the separating movement of the sections of the flask to a movement substantially perpendicular to the plane of the meeting edges of the flask; an intermediate rest at each side of the flask for supporting the pattern during its withdrawal from between the separated flask-sections; and mechanism for raising the cope-section.

18. In a molding-machine, a flask having a cope-section provided with projections combined with stops on said projections adapted to engage with the pattern; guides for confining the separating movement of the sections of the flask to a movement substantially perpendicular to the plane of the meeting edges of the flask; an intermediate adjustable rest at each side of the flask for supporting the pattern during its withdrawal from between the separated flask-sections; and mechanism for raising the cope-section.

19. A flask provided with upper and lower boards whose inward movement is limited by the edges of the respective flask-sections, and the upper board having projecting pieces adapted to contact with the upper edge of the cope-section and thereby limit the inward movement of the board, in combination with presser mechanism; and mechanism for separating the flask-sections and for positioning the pattern in the space between the separated sections free to be withdrawn laterally from between the latter.

20. In a molding-machine, the combination of a flask-supporting platen; mechanism comprising a series of lifting-pins for separating the sections of the flask, said pins working through openings in the platen; and cover-plates shiftably secured to the platen adjacent to openings therein for the passage of the lifting-pins.

21. In a molding-machine, the combination of a flask-supporting platen provided with elongated slots in its upper face; a lifting mechanism comprising a series of lifting-pins working in said slots for separating the sections of the flask supported on the platen; and perforated closure-plates secured to said platen and adjustable to bring any desired perforation therein into register with the corresponding slot in the platen.

22. In a molding-machine, the combination of a flask-supporting platen provided with a slotted sand-shedding upper face; lifting mechanism comprising a series of lifting-pins working in said slots for separating the sections of the flask supported on the platen; and perforated closure-plates secured to said platen and adjustable to bring any desired perforation therein into register with the corresponding slot in the platen.

23. In a molding-machine, the combination of a ribbed flask-supporting platen; a presser mechanism; stops on the cope-section of the flask for engaging with and raising the pattern from the cope-section; a carrier below the platen; a series of lifting-pins on the carrier and which are adapted to raise the cope-section upon the elevation of the carrier; cam-actuators for raising said carrier; and a crank for operating said actuators.

24. The combination with a platen, of an adjustable flask-locator; separating mechanism operative to separate the sections of the located flask; a crank for operating said mechanism; and a locking device for locking the located flask in position during the operation of said mechanism.

25. A pattern having a spring-pressed stripping-plate and lateral projections, in combination with lifting mechanism for first lifting the cope-section and afterward engaging with said lateral projections and raising the pattern into the space between the separated sections clear of the flask-sections; and means for withdrawing the pattern laterally therefrom.

26. A pattern having a stripping-plate and lateral projections, in combination with lifting mechanism for first lifting the cope-section and afterward engaging with said lateral projections and raising the pattern into the space between the separated sections clear of the flask-sections; and means for withdrawing the pattern therefrom.

HENRY G. VOIGHT.

Witnesses:
SADIE L. FINNIGAN,
STANLEY PARKER.